(12) United States Patent
Webster

(10) Patent No.: US 6,339,129 B1
(45) Date of Patent: Jan. 15, 2002

(54) POWDER COATINGS FROM CYCLIC CARBONATE FUNCTIONAL POLYMERS AND AMINE CARBAMATE SALTS

(75) Inventor: Dean Charles Webster, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/409,219

(22) Filed: Sep. 30, 1999

Related U.S. Application Data
(60) Provisional application No. 60/112,288, filed on Dec. 15, 1998.

(51) Int. Cl.[7] .............................................. C08L 37/00
(52) U.S. Cl. ..................... 525/327.2; 427/385.5; 525/374; 525/382; 525/410; 525/417; 526/269; 526/270; 526/314
(58) Field of Search ................................ 526/314, 269, 526/270; 525/374, 382, 410, 417, 327.2; 427/385.5

(56) References Cited

U.S. PATENT DOCUMENTS

| | | | |
|---|---|---|---|
| 2,979,514 A | | 4/1961 | O'Brian et al. |
| 5,045,602 A | | 9/1991 | Wamprecht et al. |
| 5,373,069 A | * | 12/1994 | Rehfuss ...................... 525/456 |
| 5,567,527 A | | 10/1996 | Webster et al. |
| 5,726,246 A | * | 3/1998 | Rehfuss ...................... 525/100 |
| 5,726,251 A | | 3/1998 | Wilkinson et al. |
| 5,976,615 A | * | 11/1999 | Menovcik ................... 427/140 |
| 6,071,568 A | * | 6/2000 | Harmon ................... 427/407.1 |

FOREIGN PATENT DOCUMENTS

| | | |
|---|---|---|
| EP | 0 421 666 A2 | 4/1991 |
| WO | WO97/23516 A1 | 7/1997 |
| WO | WO98/37110 A1 | 8/1998 |
| WO | WO98/52980 A1 | 11/1998 |

OTHER PUBLICATIONS

Polym. Mater. Sci. Eng. (1997), pp. 302–303,"Synthesis of Cyclic Carbonate Functional Polymers," Dean C. Webster et al.

STN Chemical Abstracts, (1973), "Polymerization of Vinyl-ethylene Carbonate and Polymer Reaction," S. Sugimoto et al.

Polymer News, 1998, vol. 23, pp. 187–192, "Cyclic Carbonate Functional Polymers: Synthesis and Applications," Dean C. Webster.

Seisan Kenkyu, v. 25, No. 7, 1973, "Polymerization of Vinylethylene Carbonate and Reaction of the Polymer," Teruzo Asahara et al.

Plasticheskie Massy, No. 2, 1996, p. 19, "Copolymers of Vinylethylene Carbonate with Substituted Ethylenes," L. V. Semenova et al.

ACS Symposium Series 704, 1998, pp. 303–320, "Synthesis of Cyclic Carbonate Functional Polymers," Dean C. Webster et al.

* cited by examiner

*Primary Examiner*—Fred Zitomer
(74) *Attorney, Agent, or Firm*—B. J. Boshears; Bernard J. Graves, Jr.

(57) ABSTRACT

Curable coating compositions for powder coatings are disclosed which are composed of a cyclic carbonate functional polymer and a carbamate salt of a multifunctional amine.

10 Claims, No Drawings

POWDER COATINGS FROM CYCLIC CARBONATE FUNCTIONAL POLYMERS AND AMINE CARBAMATE SALTS

This application claims the benefit of Provisional Application No. 60/112,228, filed Dec. 15, 1998.

BACKGROUND OF THE INVENTION

Polymers containing the 5-membered cyclic carbonate functionality may be obtained via a number of methods. A recent review (*Polymer News*, 23(6), 187–192 (1998)) summarizes many of the methods that have been reported in the literature of the synthesis of cyclic carbonate functional polymers and oligomers.

*Seisan Kenkyu*, 25 (7), (1973), describes the synthesis of the homopolymer of vinyl ethylene carbonate and copolymers of vinyl ethylene carbonate with styrene, vinyl acetate, and maleic anhydride. The only vinyl ester comonomer described is vinyl acetate. Copolymerizations were conducted in bulk to low conversion and solubility of the copolymers made was not discussed. This article also describes an attempt to crosslink a vinyl ethylene carbonate containing copolymer with ethylene diamine. This attempt was unsuccessful.

*Plasticheskie Massy*, No. 2, 1996, 19–22 describes copolymerization of vinyl ethylene carbonate with methyl methacrylate, ethyl acrylate, and styrene. Yields of the copolymers were low and decreased as the level of vinyl ethylene carbonate was increased. The highest level of vinyl ethylene carbonate incorporated into a copolymer was 31.98 mole percent. This study did not include the copolymerization of vinyl ethylene carbonate with any vinyl ester monomers.

U.S. Pat. No. 5,567,527 describes the formation of coatings by copolymerization of vinyl ethylene carbonate with other comonomers and then crosslinking with multifunctional primary amines.

ACS Symposium Series 704 (Functional Polymers), 303–320 (1998) describes copolymerization experiments with vinyl ethylene carbonate and other unsaturated monomers. Copolymers of vinyl ethylene carbonate with vinyl acetate were incompatible with the solvent at vinyl ethylene carbonate contents of 40 percent and higher.

Cyclic carbonate functional acrylic copolymers may be prepared from the copolymerization of the acrylate and methacrylate esters of glycerin carbonate with other unsaturated monomers and are described for example in U.S. Pat. No. 2,979,514.

U.S. Pat. No. 5,726,251 discloses the use of certain amine carbamate salts as crosslinkers for epoxy resins in powder coatings. The amine carbamate salts are made by the reaction of a polyfunctional amine with carbon dioxide. Amine carbamate salts suitable for this application are solids and are stable toward water absorption and decomposition. The amine carbamate salts are blended with a solid epoxide functional resin using either melt extrusion or supercritical carbon dioxide. Upon coating the resulting powder on a substrate and heating, the powder melts and flows, the carbon dioxide is liberated from the amine carbamate salt, and the resulting amine reacts with the epoxy functional resin effecting cure. This patent only teaches the use of an epoxy functional resin with the amine carbamate salt. It also only discloses the use of difunctional amines as amine carbamate salt crosslinkers.

BRIEF SUMMARY OF THE INVENTION

The present invention describes the formation of cyclic carbonate functional polymer compositions by reaction of ethylenically unsaturated cyclic carbonate functional monomers and at least one other comonomer compatible with cyclic carbonate functional monomers. The resulting polymer compositions may be reacted with amine carbamate salts to form curable powder coating compositions.

DETAILED DESCRIPTION OF THE INVENTION

Cyclic carbonate polymer compositions of the present invention may be formed by reaction of ethylenically unsaturated cyclic carbonate functional monomers and at least one other comonomer compatible with cyclic carbonate functional monomers.

Vinyl ethylene carbonate is a preferred ethylenically unsaturated cyclic carbonate functional monomer for free radical copolymerization to form cyclic carbonate polymers. The homopolymer of vinyl ethylene carbonate may also be prepared by free radical polymerization. This polymer, however, has a low molecular weight and is soluble in only dipolar aprotic solvents, such as N-methyl pyrrolidinone, N,N-dimethyl acetamide, N,N-dimethyl formamide, dimethyl sulfoxide, and the like. These type solvents may be undesirable in a number of coating applications due to their toxicity and generally slow evaporation rate from a coating film. For use in powder coatings, the polymer must also be freed from solvents by either precipitation or extrusion.

In addition, the homopolymer of vinyl ethylene carbonate has poor compatibility with other resins or materials containing functional groups that would react with the cyclic carbonate groups for the formation of a cured thermosetting coating. This incompatibility may lead to incomplete reaction of the cyclic carbonate groups and the groups on the other resin and result in a coating with poor performance.

Vinyl ethylene carbonate may however be copolymerized with other ethylenically unsaturated monomers to form useful polymer compositions of the present invention. Preferred compositions include those containing from about 20 to about 50 percent vinyl ethylene carbonated reacted with at least one other comonomer.

Other monomers which may be used in copolymerizations with vinyl ethylene carbonate include, but are not limited to, the following:

(i) acrylic, methacrylic, crotonic or other unsaturated acids and their esters. These esters include methyl acrylate, ethyl acrylate, propyl acrylate, methyl methacrylate, butyl acrylate, butyl methacrylate, 2-ethyl hexyl acrylate, 2-ethyl hexyl methacrylate, hydroxy ethyl acrylate, hydroxy ethyl methacrylate, and the like;

(ii) Styrene-type monomers such as styrene, alpha-methyl styrene, vinyl toluene, and the like;

(iii) vinyl ester monomers such as vinyl acetate, vinyl propanoate, vinyl butyrate, vinyl 2-ethyl hexanoate, vinyl neononanoate, vinyl pivalate, vinyl neodecanoate, vinyl neoundecanoate, and the like;

(iv) allyl compounds which include allyl alcohol, allyl acetate, allyl chloride, and the like;

(v) other copolymerizable unsaturated monomers such as dimethyl maleate, dimethyl itaconate, diethyl maleate, dioctyl maleate, vinyl chloride, ethylene, acrylonitrile, acrylamide, and the like.

When copolymerized with esters of acrylic acid, esters of methacrylic acid or styrene, complete incorporation of vinyl ethylene carbonate into the copolymer is not achieved. By freeing the cyclic carbonate copolymer formed from the solvent by either precipitation or extrusion, any unreacted vinyl ethylene carbonate would also be removed. Thus, the fact that vinyl ethylene carbonate is not completely incorporated into a copolymer with methacrylic or acrylic monomers is not a significant barrier to use in powder coating applications.

More than one other comonomer may be used with vinyl ethylene carbonate in the copolymerization to yield the desired performance properties.

Particularly preferred polymer compositions are copolymers of vinyl ethylene carbonate with vinyl neononanoate, where vinyl ethylene carbonate is present in an amount from about 20 to about 50 weight percent.

Preferred compositions are those containing at least two cyclic carbonate groups per molecule, having a glass transition temperature of 40° C., and those compatible with the crosslinker.

The copolymerization of vinyl ethylene carbonate with vinyl ester monomers may be effected by any process used for free radical copolymerization including bulk, solution, emulsion, and suspension polymerization. A preferred process of the present invention involves gradual or incremental addition of a mixture of monomers simultaneously with the initiator to a vessel containing preheated solvent.

The choice of free radical initiator depends on the reaction conditions desired for the copolymerization. The polymerization may be initiated by conventional free radical initiators such as benzoyl peroxide, di-t-butyl peroxide, t-butyl peroctoate, t-amyl peroxy-2-ethyl hexanoate, t-butyl peroxy-2-ethyl hexanoate, hydrogen peroxide, dicumyl peroxide, t-butyl hydroperoxide, potassium or ammonium peroxydisulfate, 2,2'-azobis(2-methylpropanenitrile), 2,2'-azobis(2-methylbutanenitrile), etc. Redox initiation may be carried out in any usual manner using for example persulfate/metabisulfite, hydrogen peroxide/sodium formaldehyde sulfoxylate, t-butyl hydrogen peroxide/sodium formaldehyde sulfoxylate, etc. Most preferred are those initiators that impart little color to the formed homopolymer or copolymer.

Copolymers of vinyl ethylene carbonate and other ethylenically unsaturated monomers may be readily prepared. If these copolymers are prepared in solution, the polymer must also be freed from the solvent using precipitation or extrusion.

Solution polymerizations may be carried out in a solvent appropriate for the monomers, the desired end-use of the polymer, and the polymerization conditions. Solvents may include xylene, toluene, methyl amyl ketone, methyl isobutyl ketone, acetone, ethyl ethoxy propionate, ethylene glycol butyl ether, propylene glycol monomethyl ether, propylene glycol monomethyl ether acetate, and the like.

Preferred solvents are those that dissolve both the monomers and the polymer produced, and do not introduce undesired color to the polymer. These solvents include glycol ethers, ketones and glycol ether esters. Mixtures of solvents may also be used.

After the polymerization reaction is complete, the polymer may be isolated by precipitation in a non-solvent, extrusion, or vacuum stripping, thus forming a solid suitable for use in a powder coating composition.

In order to effect crosslinking to form a thermoset coating, the cyclic carbonate functional polymer must be reacted with a material reactive with the cyclic carbonate functional polymer group under the cure conditions of interest. Preferred reactive materials include, but are not limited to, multifunctional amines or reactive amines containing at least two reactive amine groups.

It is known that multifunctional amines may be used to effect the crosslinking of cyclic carbonate functional polymers. Most commercially available multifunctional amines, however, are liquids, which are not suitable for powder coatings. In addition, since multifunctional amines are reactive with cyclic carbonate functional group, mixtures of multifunctional amines with cyclic carbonate functional polymers are not stable.

In order to form a curable powder coating composition, it is preferred that the cyclic carbonate functional copolymer be reacted with an amine carbamate salt.

Amines may be converted to their carbamate salts by the reaction with carbon dioxide. Most amine carbamate salts are unstable and hygroscopic and absorb water rapidly. Certain amine carbamate salts, however, are stable under ambient conditions and do not absorb water at an appreciable rate or decompose.

Compounds which may be used as their amine salts in the present invention include compounds containing two or more primary amine groups. Examples include, but are not limited to, 4,4'-bisaminocyclohexyl methane (PACM), amino ethyl piperazine, isophorone diamine, tris(2-aminoethyl)amine, triaminononane, and the like.

Preferred are those amines which form stable carbamate salts and readily react with the cyclic carbonate groups upon heating and deblocking.

Especially preferred are the carbamate salts of triamines. Example include, but are not limited to, tris(2-aminoethyl)amine, triaminononane, and the like.

Other materials may be added to the coating composition. These include catalysts, flow modifiers, pigments, stabilizers and the like.

This invention may be further illustrated by the following examples of preferred embodiments thereof, although it will be understood that these examples are included merely for purposes of illustration and are not intended to limit the scope of the invention unless otherwise specifically indicated.

EXAMPLES

Example 1

Cyclic Carbonate Polymer

A two-piece 500 ml resin kettle was equipped with an overhead mechanical stirrer, heating mantle, condenser, thermocouple, nitrogen inlet. The reactor was charged with 140 g of propylene glycol monomethyl ether and heated with stirring to 80° C. In a separate container, 130 g vinyl ethylene carbonate, 130 g VeoVa-9 (vinyl neononanoate sold by Shell Chemical Company), and 10.4 g of Lupersol-575 (t-amyl peroxy 2-ethylhexanoate sold by Elf Atochem North America) were mixed. The monomer mixture was added to the heated solvent at a uniform rate using a metering pump, over a period of 3 hours. One hour after completion of the monomer addition, 0.5 g Lupersol-575 initiator was added to the reaction mixture. After an additional hour, the reaction mixture was cooled and poured out. The resin had a solids content of 63.6 percent and was clear and colorless, indicating compatibility with the solvent. The resin had a Tg of 72.4° C. as determined by differential scanning calorimetry.

Example 2

Cyclic Carbonate Polymer

A two-piece 500 ml resin kettle was equipped as described in Example 1. The reactor was charged with 140 g of propylene glycol monomethyl ether and heated with stirring to 80° C. In a separate container, 124.8 g vinyl ethylene carbonate, 78 g VeoVa-9, 57.2 g vinyl acetate and 10.4 g of Lupersol-575 were mixed. The monomer mixture was added to the heated solvent at a uniform rate using a metering pump, over a period of 3 hours. One hour after completion of the monomer addition, 0.5 g Lupersol-575 initiator was added to the reaction mixture. After an additional hour, the reaction mixture was cooled and poured out. The resin had a solids content of 67.0 percent and was clear and colorless, indicating compatibility with the solvent. The resin had a Tg of 51.7° C. as determined by differential scanning calorimetry.

Example 3

Amine Carbamate Salt

Tris(2-aminoethyl)amine, 60.0 g, and tetrahydrofuran, 360 ml, was charged to a 500 ml round-bottomed flask equipped with a mechanical stirrer, thermocouple, $CO_2$ inlet, and condenser. Flask was cooled to 4° C. using an ice water bath. $CO_2$ was bubbled into reaction over 5 hours. Product was filtered, washed with additional tetrahydrofuran, and dried in a vacuum oven at 50° C.

Example 4

Powder Coating Composition

A powder coating composition may be prepared using the cyclic carbonate functional polymer from Example 1 and the amine carbamate salt of Example 3. The cyclic carbonate functional polymer is precipitated in methanol and dried in a vacuum oven. Then the cyclic carbonate functional resin is blended with the amine carbamate salt, pigments, and other known additives. This mixture is passed through an extruder and the product cooled and ground to form a powder. The powder is applied to steel panels and cured in an oven.

The invention has been described in detail with particular reference to preferred embodiments thereof, but it will be understood that variations and modifications may be effected within the spirit and scope of the invention.

What is claimed is:

1. A curable powder coating composition comprising a copolymer comprising an ethylenically unsaturated cyclic carbonate functional monomer and at least one ethylenically unsaturated comonomer, and an amine carbonate salt.

2. The coating composition of claim 1 wherein the amine carbamate salt is formed from an amine compound containing two or more primary amine groups.

3. The coating composition of claim 2 wherein the amine compound is selected from the group consisting of 4,4'-bisaminocyclohexyl methane (PACM), amino ethyl piperazine, isophorone diamine, tris(2-aminoethyl)amine and triaminononane.

4. The coating composition of claim 2 wherein the amine compound is a triamine.

5. The coating composition of claim 4 where the triamine is selected from the group consisting of tris(2-aminoethyl) amine and triaminononane.

6. The coating composition of claim 1 wherein the ethylenically unsaturated comonomer is selected from the group consisting of methyl acrylate, ethyl acrylate, propyl acrylate, methyl methacrylate, butyl acrylate, butyl methacrylate, 2-ethyl hexyl acrylate, 2-ethyl hexyl methacrylate, hydroxy ethyl acrylate, hydroxy ethyl methacrylate, styrene, alpha-methyl styrene, vinyl toluene, vinyl acetate, vinyl propanoate, vinyl butyrate, vinyl 2-ethyl hexanoate, vinyl neononanoate, vinyl pivalate, vinyl neodecanoate, vinyl neoundecanoate, allyl alcohol, allyl acetate, and allyl chloride.

7. The coating composition of claim 6 wherein the amine carbamate salt is formed from an amine compound containing two or more primary amine groups.

8. The coating composition of claim 7 wherein the amine compound is selected from the group consisting of 4-4'bisaminocyclohexyl methane (PACM), amino ethyl piperazine, isophorone diamine, tris(2-aminoethyl)amine and triaminononane.

9. The coating composition of claim 7 wherein the amine compound is a triamine.

10. The coating composition of claim 9 where the triamine is selected from the group consisting of tris(2-aminoethyl)amine and triaminononane.

* * * * *